United States Patent [19]

Johnson et al.

[11] Patent Number: 4,840,115
[45] Date of Patent: Jun. 20, 1989

[54] AIR OUTLET ARRANGEMENT OF A HEATING AND/OR AIR-CONDITIONING INSTALLATION, ESPECIALLY FOR THE REAR SPACE OF A PASSENGER MOTOR VEHICLE

[75] Inventors: Paul Johnson, Munich; Karl W. Karnebogen, Kottgeisering, both of Fed. Rep. of Germany

[73] Assignee: Bayerische Motoren Werke Aktiengesellschaft, Munich, Fed. Rep. of Germany

[21] Appl. No.: 188,915

[22] Filed: Sep. 2, 1988

[30] Foreign Application Priority Data

May 4, 1987 [DE] Fed. Rep. of Germany ....... 3714820

[51] Int. Cl.$^4$ .............................................. B60H 1/34
[52] U.S. Cl. ................... 98/2.03; 98/DIG. 7; 98/DIG. 11
[58] Field of Search ............... 98/2, 2.03, 40.19, 41.1, 98/41.3, DIG. 7, DIG. 11

[56] References Cited

U.S. PATENT DOCUMENTS

| 760,182 | 5/1904 | Chapman et al. | 98/41.1 X |
|---|---|---|---|
| 903,339 | 11/1908 | Symons | 98/DIG. 7 X |
| 2,234,268 | 3/1941 | McCollum | 237/28 |
| 2,989,854 | 6/1961 | Gould | 98/2.03 X |
| 3,550,522 | 12/1970 | Baver et al. | 98/2.07 |
| 4,035,018 | 7/1977 | Erbele et al. | 98/DIG. 11 X |
| 4,343,230 | 8/1982 | Lundström | 98/2 X |
| 4,545,379 | 10/1985 | Jenkins | 98/40.19 X |

FOREIGN PATENT DOCUMENTS

| 189674 | 7/1986 | European Pat. Off. | 98/2.03 |
|---|---|---|---|
| 1077997 | 3/1960 | Fed. Rep. of Germany . | |
| 2259628 | 6/1974 | Fed. Rep. of Germany | 98/2.03 |
| 7731774 | 10/1977 | Fed. Rep. of Germany . | |
| 3002351 | 8/1980 | Fed. Rep. of Germany . | |
| 3119557 | 3/1982 | Fed. Rep. of Germany . | |
| 8337426 | 4/1984 | Fed. Rep. of Germany . | |
| 3339803 | 5/1984 | Fed. Rep. of Germany . | |
| 3309560 | 9/1984 | Fed. Rep. of Germany . | |
| 57-209419 | 12/1982 | Japan . | |
| 58-194616 | 11/1983 | Japan | 98/2.03 |

*Primary Examiner*—Harold Joyce
*Attorney, Agent, or Firm*—Barnes & Thornburg

[57] ABSTRACT

An air outlet arrangement of an air-conditioning system for the rear space of a passenger motor vehicle is provided with a pivotal outlet channel that carries at its free end a ventilation grill and is integrated in its entirety in at least one pivot position spatially in, respectively, at interior equipment components arranged in the passenger motor vehicle rear space, for example, in the housing of the air outlet arrangement which, in its turn, accommodates a complete heating-, air-conditioning unit. In another embodiment, the outlet channel is tied to the back side of the backrest of the passenger motor vehicle front seat and extends nearly up to the upper end of the backrest. An optimum air-conditioning of the rear space is possible from this position.

8 Claims, 2 Drawing Sheets

AIR OUTLET ARRANGEMENT OF A HEATING AND/OR AIR-CONDITIONING INSTALLATION, ESPECIALLY FOR THE REAR SPACE OF A PASSENGER MOTOR VEHICLE

BACKGROUND AND SUMMARY OF THE INVENTION

The present invention relates to an air outlet or outflow arrangement of a heating and/or air-conditioning installation, especially for the rear space of a passenger motor vehicle of the type described in the DE-OS No. 30 02 351.

An auxiliary arrangement for air-conditioning control units in motor vehicles is described in this prior publication in such that a housing is arranged in the rear space of the vehicle which takes off air-conditioned air from an air feed channel of the vehicle air-conditioning system and feeds the same with aim into the vehicle rear space by means of a fan provided inside of the housing. The intensity of the rear space ventilation is thereby matched to that of the forward vehicle interior space because this fan is able to compensate for the higher flow resistances caused by the longer air feed channels or ducts. Nonetheless, no similarly agreeable air-conditioning can be offered therewith to the rear passengers as is enjoyed by the persons in the front seat area. Whereas numerous and different types of outlets are present thereat (in the leg space, at different places of the instrument panel and partly even in the doors), one outlet of the type described in the aforementioned prior publication had to suffice up to now for the rear space.

It would be thinkable to provide also in the rear space outlets in the side walls or side doors; however, this solution is extraordinarily costly because the air feed ducts or channels have to be laid out inside of doors to be pivoted or around the same and would exhibit still further increased lengths. Another possibility would be the use of variably adjustable extended warm air nozzles as are disclosed, for example, in the DE-OS No. 33 09 560 (especially FIG. 3) or in the German Gebrauchsmuster No. 83 37 426. Flexible hoses are thereby used in each case in connection therewith in order to bring the discharge nozzles into the desired position. However, this solution is not only extraordinarily unattractive from styling points of view, but also demonstrates only a limited functionality. Thus, the flexible hose has a high collapse tendency by reason of the twisting to be expected, exhibits in its positioning an uncontrollable behavior and requires a non-acceptably large diameter by reason of the bellows-like construction. Furthermore, such warm air nozzles protruding into the rear space, always limit the space conditions, i.e., also when they are not required or required only minimally.

It is therefore the object of the present invention to provide an air outlet arrangement of an air-conditioning system for a passenger motor vehicle rear space which permits as agreeable and versatile as possible a positioning of the outflowing air stream, whereby at the same time a high functionality is to be assured. Furthermore, at least with non-use of the air outflow arrangement, the outflow channel thereof is to influence the space condition in the rear space as little as possible.

The underlying problems are solved according to the present invention in that at least one pivotally arranged outlet channel preferably made up of rigid pipes is provided which at least in one pivot position is integrated in or at other interior equipment components arranged in the passenger motor vehicle rear space.

A pivotally arranged discharge channel built preferably of rigid pipes or tubular members permits both a variable positioning and additionally avoids the aforementioned disadvantages of flexible hoses. By integrating the outflow or outlet channel according to the present invention at least in one pivoted position—preferably in that position in which it is during non-use—into another interior equipment component of the rear space, it requires no additional space and does not further limit the space conditions in the rear space.

According to another feature of the present invention, the outlet channel may be telescopically extensible or may be provided additionally with spherically shaped joints for further increasing its positioning flexibility. However, it is particularly advantageous to tie the outlet channel to the back side of the backrest of a vehicle front seat or to construct the same so as to be adapted to be tied thereto. The outlet channel is therewith adapted to be fixed in a simple manner and even offers markedly more versatile positioning possibilities and herewith air-conditioning possibilities than have been offered heretofore in the forward vehicle interior space which as such is quite well air-conditioned. Additionally, such an outlet channel can be constructed extraordinarily pleasing from a styling point of view. It is also advantageous for the simplification of its operation to arrange at least one operating or adjusting element near the outlet opening of the pivotal outlet channel or duct. For example, known outlet grills with adjusting flaps and knurled wheels are possible therefor in accordance with the present invention.

According to still another feature of the present invention, the air outlet arrangement may be so constructed that, independently of the temperature wishes in the forward vehicle interior space, a.c. conditions of their own are adjustable for the rear space. In addition to the auxiliary fan in the air outlet arrangement, a separate air-conditioning unit is provided for that purpose. Though air-conditioning units of their own for the rear area are known as such from the German Gebrauchsmuster No. 77 31 774 as well as from the DE-OS No. 33 39 803, no further suggestions can be found in these prior art publications for an air outlet arrangement with pivotal outlet channels in accordance with the present invention.

It should be mentioned expressly at this point that an "air-conditioning system" mentioned in the present invention may be constructed both as simple heating heat-exchanger, as pure air-conditioning evaporator or also as combined heating-air-conditioning system with fan unit. This is completely immaterial for the nature of the present invention.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWINGS

Figure 1:
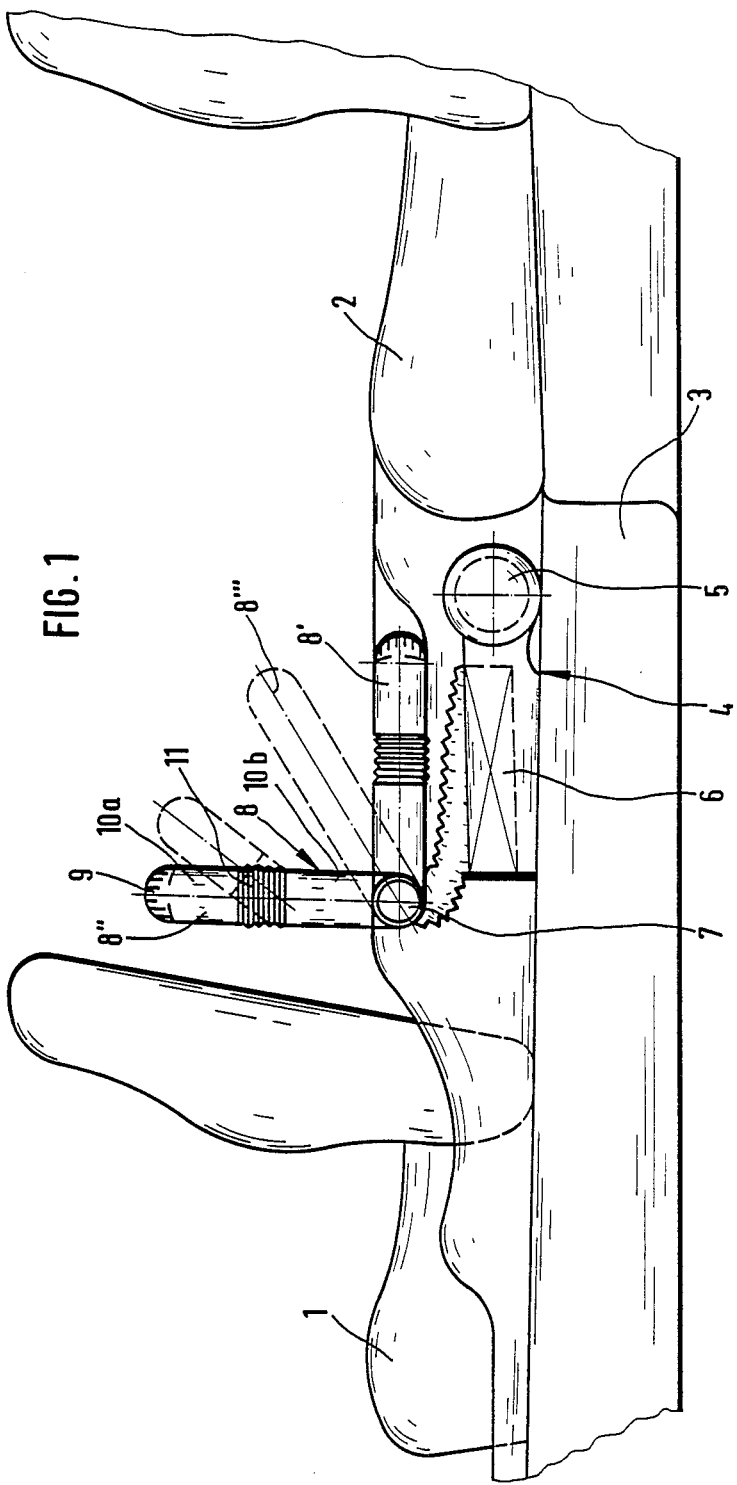
FIG. 1 is a somewhat schematic side elevational view of an air outlet arrangement with a lowerable outlet channel in accordance with the present invention arranged on the center tunnel of a passenger motor vehicle.

Referring now to the drawing wherein like reference numerals are used throughout the various views to designate like parts, an air outlet or outflow arrangement generally designated by reference numeral 4 is arranged on the center tunnel 3 within the rear space of a passenger motor vehicle, delimited by the front seat 1 as well as the back seat bench 2; the air outflow arrangement 4 includes an air inlet opening (not shown), a fan 5, a heat-exchanger 6, as well as an air outlet opening 7. An outlet or outflow channel 8 adjoins the outlet opening 7.

In the first embodiment according to FIG. 1, the outlet channel 8 is pivotally arranged at the air outlet arrangement 4 in such a manner that it is integrated spatially in the housing of the air outlet arrangement 4 at least in one position—namely, the position 8'. In case of need, it can be displaced into other positions—for example, 8", 8'''.

The free end of the outlet channel 8 carries a venting grill 9, known as such and provided with adjusting flaps. Further positioning possibilities are provided in that the outlet channel 8 is made up of two tubular members 10a and 10b rigid as such which are connected with each other by way of a flexible bellows 11.

Figure 2:
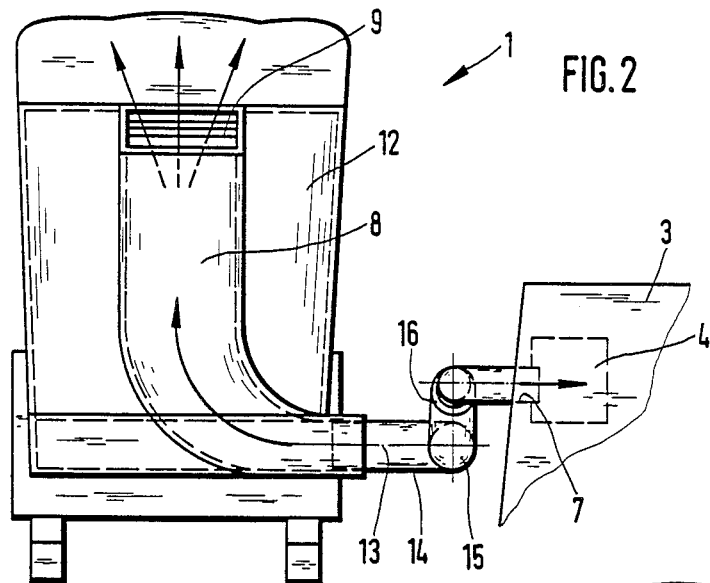
FIG. 2 is a somewhat schematic rear elevational view on an outlet channel in accordance with the present invention tied to the backrest, whereby the air flow is indicated by arrows.
Figure 3:
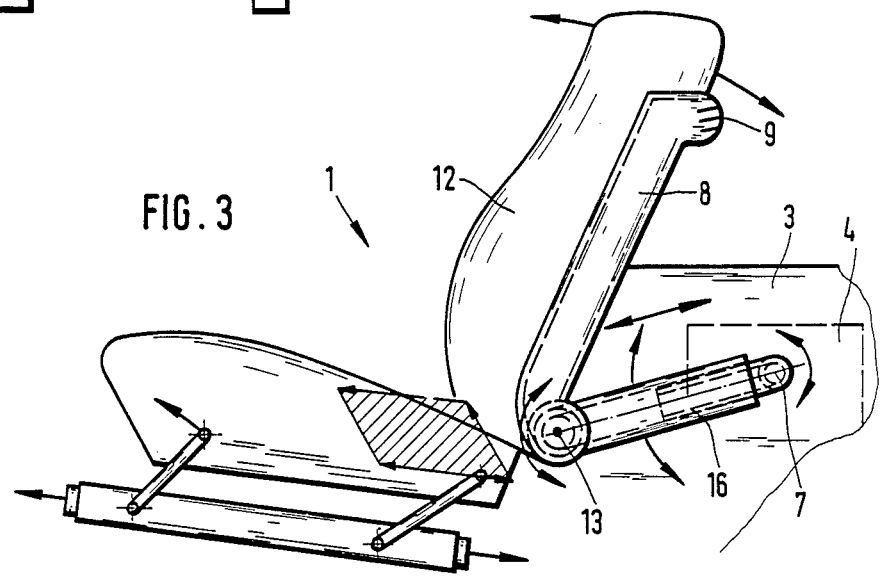
FIG. 3 is a somewhat schematic side elevational view of the arrangement of FIG. 2 whereby the possible positioning changes are indicated by arrows.

FIGS. 2 and 3 illustrate a further embodiment in which the outlet channel 8 is tied to the back side of the backrest 12 of the front seat 1. Also, this outlet channel 8 is provided at its free end with a venting grill 9 and, as the backrest 12 of the front seat is pivotal, is arranged pivotal about the common axis 13. This pivot axis 13 is formed by a tubular member 14 which, in its turn, is secured at the front seat 1. As the entire front seat 1 is adjustable both in its longitudinal position as also in its height position—as indicated by arrows—, the tubular member 14 is operatively connected with the air outlet arrangement 4 by way of a spherical joint connection 15 as well as a telescopic connection 16.

Figure 4:
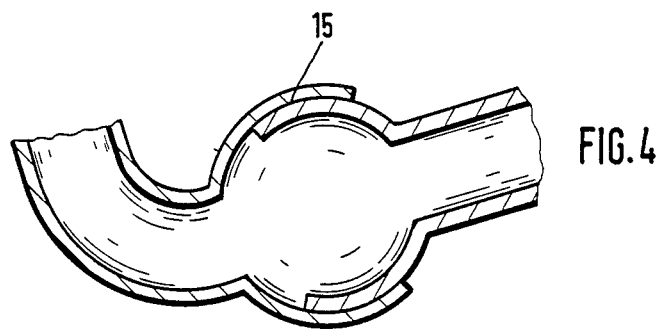
FIG. 4 is a cross-section view through a spherically shaped joint provided in the outlet channel in accordance with the present invention.

A possible spherical joint connection 15 is illustrated in detail, as an example, in FIG. 4.

Thus, the outlet or outflow channel is able to follow all movements of the backrest 12 whereby the venting grill 9 disposed near the upper end of the backrest 12, which, of course, may also be provided with operating and adjusting elements for the air-conditioning system, respectively, the outflowing air stream, has an optimal position for an air-conditioning pleasant to the rear space passengers.

The individual components, respectively, tubular parts of the outflow channel in accordance with the present invention, may thereby be made in a known manner as injection-molded parts. However, the actual constructive configuration is unimportant for the nature of the present invention, essential is the fact that an air outlet arrangement of an "air-conditioning system," as this term is broadly understood in this application, especially for the rear space of a passenger motor vehicle, be provided with a pivotally arranged outlet or outflow channel which at least in one pivot position is integrated spatially in, respectively, at other interior equipment components arranged in the passenger motor vehicle rear space.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. An air outlet arrangement of a heating and/or air-conditioning system especially for the rear space of a passenger motor vehicle, wherein the motor vehicle has two front seats with a center tunnel therebetween, the outlet arrangement comprising pivotal outlet channel means which at least in one pivot position is spatially integrated in or at other interior equipment components arranged in the passenger motor vehicle rear space so as to provide a substantially smooth contour therewith, and wherein said pivotal outlet channel has a pivot means which is connected at an air outlet located between the front seats on said center tunnel.

2. An air outlet arrangement according to claim 1, wherein the outlet channel means includes rigid tubular members.

3. An air outlet arrangement according to claim 1, wherein the outlet channel means is connected to the air outlet through telescopically extensible connection means.

4. An air outlet arrangement according to claim 3, wherein the connection means includes at least one spherically shaped joint means.

5. An air outlet arrangement according to claim 4, wherein the outlet channel means is operatively associated with the back side of a backrest of a seat arranged ahead of the rear space as viewed in the driving direction of the vehicle.

6. An air outlet arrangement according to claim 1, wherein the outlet channel means is connected to said air outlet through at least one spherically shaped joint means.

7. An air outlet arrangement according to claim 1, wherein the outlet channel means is operatively associated with the back side of a backrest of a seat arranged ahead of the rear space as viewed in the driving direction of the vehicle.

8. An air outlet arrangement with a fan means according to claim 1, wherein an air-conditioning unit is provided in the air outlet arrangement.

* * * * *